Patented July 14, 1953

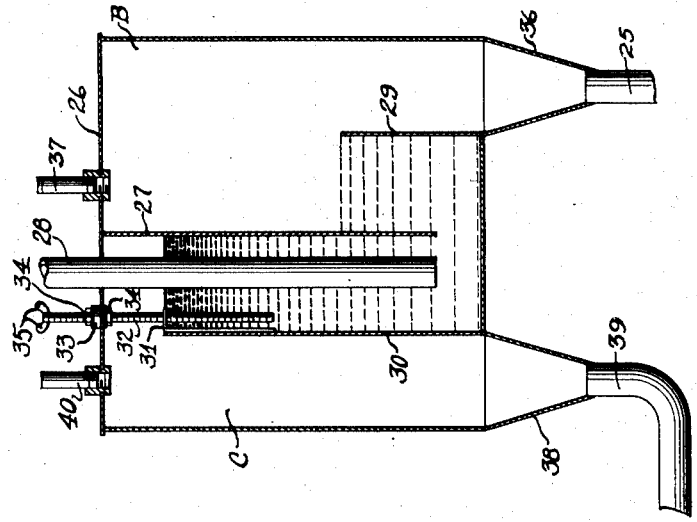
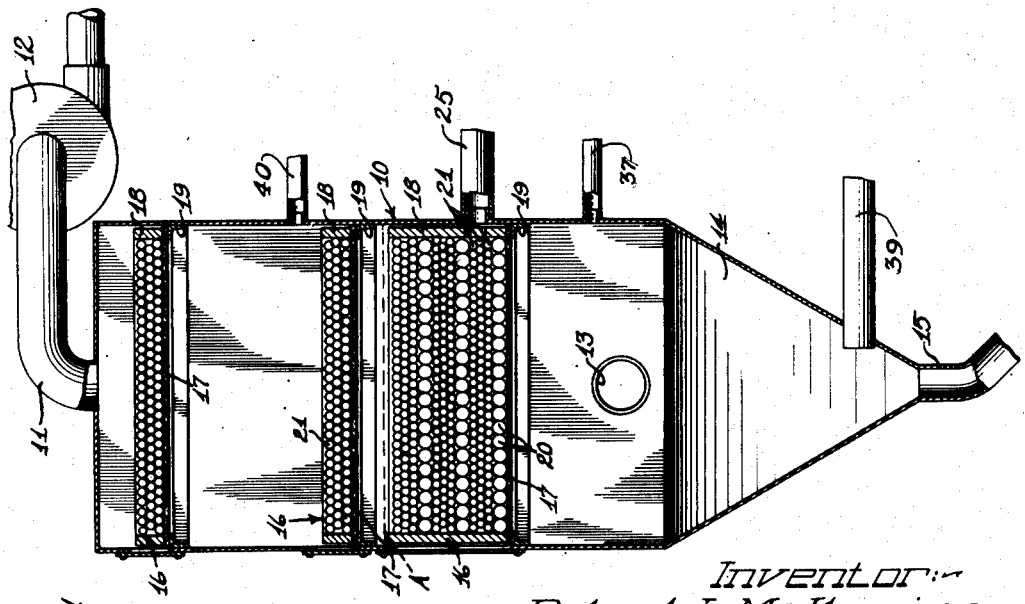

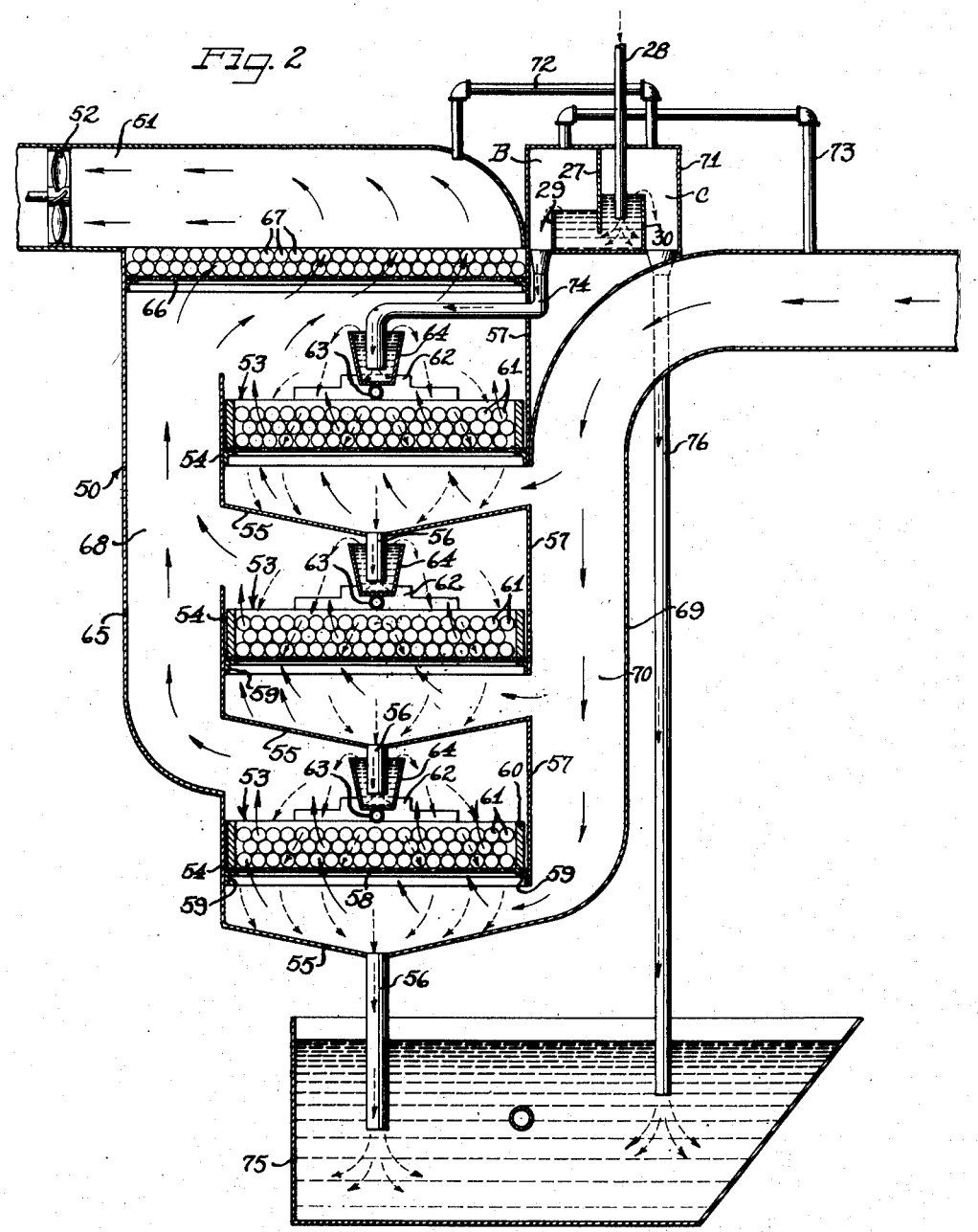

2,645,304

UNITED STATES PATENT OFFICE 2,645,304

APPARATUS FOR AND METHOD OF WATER SUPPLY CONTROL FOR DUST COLLECTORS

Robert L. McIlvaine, Chicago, Ill., assignor, by mesne assignments, to Herbert Simpson Corporation, Chicago, Ill., a corporation of Illinois Application August 22, 1950, Serial No. 180,802

7 Claims. (Cl. 183—121)

The present invention relates to a water supply control apparatus and method, and more particularly this invention deals with a control for supplying water to the water bath of a dust collector or the like to maintain a substantially constant water level at the bath, the water level being controlled in accordance with the pressure drop within the fluid stream flowing through the bath.

In various types of dust collectors and other air or fluid cleaners, it has been previously proposed that foreign particle removal be accomplished by passing the fluid stream through a water bath so that the particles suspended therein are entrapped or otherwise retained by the water of the bath. However, it has been extremely difficult to maintain a constant water level within the bath, thereby necessitating the use of an excessive amount of water to insure adequate particle removal and also erecting a substantial hindrance to fluid flow through the baths of excessive depth.

According to the principles of the present invention, there is provided an improved water control in which the level of a water bath is maintained at a substantially constant value by the feeding of water to the bath in accordance with the pressure drop within the fluid stream flowing through the bath.

It is, therefore, an important object of the present invention to provide an improved liquid control for a dust collector in which the level of a body of liquid within the collector is controlled by the differential pressure within a fluid stream flowing through the collector and through the body of liquid therein.

Another important object of the present invention is to provide a liquid bath within a dust collector for the flow of dust-laden fluid therethrough, the level of the liquid bath being maintained at a substantially constant value by regulation in accordance with the pressure drop of the fluid stream across the liquid bath.

It is a further important object of the present invention to provide a dust collector including a water bath for fluid flow therethrough, and means venting the fluid stream on either side of the water bath to a differential pressure water flow control, thereby maintaining the liquid bath at a substantially constant depth.

Still another important object of the present invention is to provide an improved method for controlling the liquid level of a water bath having a fluid stream flowing therethrough by venting the fluid stream on each side of the bath to a differential fluid pressure control and introducing additional water into the water bath whenever the level drops below a predetermined point and the resistance to fluid flow through the bath decreases.

Among the features of the present invention is the adaptability of the liquid level control to utilization within a number of different types of dust collectors. More specifically, the water level control of the present invention is particularly adapted for use with a dust collector of the type in which the fluid, such as air, is passed under differential pressure through a porous baffle formed of particulated solids disposed within a water bath. Passage of air through the baffle causes bubbling of the liquid, and bursting of the liquid bubbles creates a large number of flying liquid particles or droplets which entrap dust or other solids within the air. After the formation and bursting of such bubbles, the air is next passed through a secondary baffle which is wetted with liquid carried by the fluid and/or spattered thereon by droplets from the bursting bubbles, so that the later baffles serve to remove additional dust particles carried by the fluid stream and impinging thereon.

Preferably, the differential pressure drop within the fluid stream which is utilized to control the liquid level is taken across both the bubble-forming and bubble-bursting barrier and the wetted secondary barrier, so that an accurate pressure drop measurement is attained.

It is, therefore, a more specific object of the present invention to provide means for controlling the water level of a liquid dust-removing bath having a fluid stream flowing therethrough, the level being controlled in accordance with the pressure drop within the fluid stream as it flows through a bubble-forming and bubble-bursting barrier disposed at the water bath.

Yet another specific object of the present invention is to provide a method of removing dust from dust-laden air by the formation and bursting of millions of bubbles within a liquid bath, thereby entrapping dust in liquid droplets formed by the bursting of the bubbles, contacting dust-laden air with a wetted surface, and controlling the level of the water bath in accordance with the pressure drop across the water within the fluid chamber across the water bath and the wetted surface.

Other and further objects, features and advantages of the present invention will be readily apparent from the following detailed description of certain preferred embodiments thereof taken in conjunction with the accompanying drawings, in which:

Figure 1 is a fragmentary vertical sectional view taken centrally through a dust collector which is provided with a liquid supply control of the present invention;

Figure 1a is an enlarged fragmentary vertical sectional view taken centrally through a liquid supply control of the present invention operating in conjunction with the dust collector shown in Figure 1; and Figure 2 is a fragmentary vertical sectional view illustrating a different form of dust collector provided with a water supply control of the present invention.

As shown on the drawings:

In Figure 1, the reference numeral 10 refers generally to a substantially rectangular casing provided with an upper outlet conduit 11 having a fluid impeller, such as a centrifugal pump 12, for drawing dust-laden air or similar fluid into the casing thorugh an inlet port 13, the casing 10 being provided with a lower sump portion 14 discharging through a conduit 15 into a settling tank or the like (not shown).

The casing 10 intermediate the fluid inlet 13 and the discharge conduit 11 is provided with a plurality of superimposed trays 16, each having a perforate bottom defined by a wire screen or the like 17 and upstanding side walls 18 seated upon angle iron supports 19 spaced along the vertical length of the casing. The lower tray 16 is substantially filled with a plurality of particulated strata each made up of a plurality of layers of varying sizes of substantially spheroidal particles.

More particularly, the screen 17 of the lowermost tray carries directly thereon a layer of relatively large spheroids 20, and a plurality of layers of relatively smaller spheroids 21 are seated upon and overlie the larger spheroids 20. The second stratum is built up in the same manner as the first stratum of relatively large particles superimposed on the smaller particles 21 of the lower stratum. As shown on the drawings, three strata, each composed of one layer of relatively large particles 20 and three layers of relatively small particles 21, are disposed within the lowermost tray 16. However, it will be appreciated that the number of strata and the number of layers in each stratum may be varied as desired.

The second tray 16 is supported within the casing 10 and in closely spaced relation to and directly overlying the first tray 16. The second tray 16 is substantially filled with a number of layers of uniformly sized particles 21. The third tray 16 is of substantially the same size as the second tray and is interposed between the second tray and the outlet conduit 11 to closely underlie the latter. It will be seen that dust-laden fluid entering the inlet port 13 will be drawn through each of the trays 16 in turn as it flows through the casing toward the outlet conduit 11 under the influence of the impeller 12.

The casing 10 is also adapted to contain a body of water to be maintained at a substantially constant level A as indicated in dot-dash lines in Figure 1. As the level A is built up, the water bath will enclose the first tray 16 with water being drawn from the tray also passing through the water bath. Water or other suitable liquid is introduced into the casing through a water inlet pipe 25 which communicates with the interior of the lowermost tray 16 through apertures in the adjacent casing side wall and the tray side wall.

Water is supplied to the conduit 25 through a water level control box 26 disposed adjacent the casing 10 but above the level of the lowermost tray 16, and subdivided into a pair of interior compartments B and C, respectively, by means of a central baffle depending from the box top into closely spaced relation to the bottom of the box. The chambers B and C are in communication with one another beneath the baffle 27, and water is introduced into the chambers through an inlet pipe 28 discharging into the chamber C adjacent the lowermost edge of the baffle 27.

The chamber B has mounted therein a relatively low dam 29 extending transversely across the chamber interior in spaced parallel relation to the baffle 27, and the chamber C has mounted therein a somewhat higher dam 30 also extending thereacross parallel to and in spaced relation to baffle 27. The baffle 30 is provided with an adjustable plate 31 carried by an adjusting screw 32 projecting through the top of the box 26 through a suitable fitting 33 provided with opposed lock nuts 34. It will be seen that the vertical positioning of the extension 31 relative to the dam may be accomplished by turning the screw, through the medium of a pair of ears 35, upon loosening of the lock nuts 34.

The chamber B is provided with a lower tapered outlet portion 36 establishing communication between the chamber B and the water inlet line 25. The inlet line 25 extends between the outlet portion 36 and the casing in such a manner that any overflow of dam 29 will flow toward the lowermost tray under the action of gravity. The upper portion of the chamber B is also vented to the interior of the casing 10 beneath the lowermost tray 16 and the water bath thereabout through a line 37. The chamber C is provided with a lowered tapered outlet portion 38 establishing communication between the chamber, and a conduit 39 establishes fluid flow between the chamber C and the sump portion 14 of the casing 10. The upper portion of the chamber C is connected to the casing interior through line 40 in a zone between the uppermost and the intermediate trays 16.

In the operation of the device of Figure 1, it will be appreciated that the flow box 26 functions to maintain the water bath surrounding the lowermost tray 16 at a constant level, thereby maintaining a constant head pressure in this zone. This maintenance of a constant water level is possible by virtue of the venting of the chambers B and C to the differential pressure between fluid entering the casing prior to passage through the water bath and fluid leaving the water bath. This differential pressure is the result of the resistance of the water bath in the lower tray 16 and the intermediate tray to the passage of fluid therethrough. Due to the pressure loss through these trays the absolute pressure in the chamber B will be greater than the pressure in chamber C. Expressed in another way, due to the presence of the impeller 12 in the outlet conduit 11, the vacuum pressure in the chamber C will be greater than the vacuum pressure within the chamber B.

The lower pressure within the chamber C will accommodate a higher water level behind the dam 30 than the water level accommodated behind the dam 29 by the pressure within the chamber B. The difference in water level within these chambers is equivalent to the differential pressure when expressed in inches or other linear height of water or other fluid column. Accordingly, it will be seen that upon initially starting the apparatus, the introduction of liquid to the box 26 will serve to fill the spaces defined by the dams 29 and 30 until such time that water will flow over the dam 29 to the inlet pipe 25 to surround the lowermost tray 16. After the water bath has been formed, and as the depth of the water bath increases, water will rise behind the dam 30 until such time as the water bath has reached its normal level and the dams accommodate their full measure of water as indicated in Figure 1.

At this time the full permissive pressure differential between the chambers will be obtained, and any increase in the depth of the water bath will increase this differential pressure, causing the flow of water over the dam 30 through the conduit 39 into the sump portion 14 of the casing. Thus, water flow through the pipe 28 will occur directly to the sump rather than to the water bath itself.

As soon as the water bath level drops, due to gravity drainage of water through the tray 16, the differential pressure will decrease and the lesser pressure within the chamber B will accommodate flow of water over the dam 29 and through the conduit 25 into the water bath proper. Thus, if the water level A is as high as desired, further water flow through the inlet conduit 28 will cause flow over the dam 30 into the sump 14, and while the water level of the bath is below the level A, continuous flow through the inlet pipe 28 will be directed over the dam 29 and through the inlet conduit 25 into the water bath to raise the level thereof.

With regard to the functioning of the permeable barriers directed within the casing 5, the lowermost tray 16 contains a plurality of strata made up of layers of spheroidal particles of varying size providing varying sizes of interstices between the spheroids. The smaller interstices between the smaller spheroids will cause the formation of bubbles within the liquid bath, and these bubbles burst upon entering the relatively larger interstices between the larger spheroids 20. This action occurs throughout the depth of the lowermost tray 16, while those bubbles emerging from the uppermost rows of relatively small spheroids will burst thereabove at or near the water level A.

This formation and bursting of spheroids plays an important part in the effective removal of dust from fluid introduced through the inlet 13, inasmuch as the formation of bubbles causes the adhesion of dust dispersed in the fluid to the wall of the bubbles, and the bursting of the bubbles causes entrapment of the dust by flying liquid particles thrown from the bubble by the bursting force. Those bubbles which burst at or near the water line A will cause the wetting of the spheroid layer supported on tray 16 next thereabove, so that a plurality of wetted spheroidal surfaces are available for impingement of the remaining dust particles carried by the stream passing therethrough. This impingement upon a wetted surface removes still more dust from the air. The final tray 16 also aids in removing dust from the air inasmuch as it also prevents the passage of liquid particles entrapped in the air into the upper conduit 11.

With respect to the embodiment of the invention shown in Figure 2 of the drawings, a vertically extending casing 50 is provided with an upper fluid outlet conduit 51 having mounted therein an exhaust fan or similar blower 52.

Actually, the casing includes a plurality of superimposed perforate baffle members 53 of identical size and shape, each including an upstanding side wall 54 having joined thereto a dished lower wall 55 having at the depending apex thereof a drain pipe 56. An opposing side wall 57 cooperates with the first side wall 54 to carry therebetween a perforate tray or bottom wall 58, preferably in the form of a screen supported on angle iron supports 59 secured to side walls 54 and 57 and to the end walls of the casing proper. The screen 58 has superimposed thereon imperforate tray side walls 60 confining on the screen 58 a plurality of superimposed rows of generally spheroidal particles 61. The tray end walls carries thereon spaced outstanding supporting brackets 62, and a support pipe 63 or similar rod extends transversely of the tray to closely overlie the spheroids 61. The supporting pipe 63 carries superimposed thereon a liquid trough 64 into which the drain pipe 56 of a superimposed bottom baffle 53 extends.

It will be seen that the side walls 54 of the lowermost of the baffles 53 cooperates with a casing side wall 65 to define the lower portion of one side wall casing. The other side or lateral wall of the casing is defined by the superimposed upstanding side walls 57 of the plurality of baffle casings. An additional perforate or screen baffle 66 overlies the uppermost baffle 63 and extends completely across the casing to retain thereon a plurality of spheroids 67 interposed between the casing 50 and the outlet conduits 51. The upstanding side walls 54 of the upper two trays 53, in cooperation with the walls 65 spaced therefrom, form an outlet conduit 68 for the lower two trays and the opposing side walls 57 of the lower two trays form, in cooperation with a wall 69 spaced therefrom, an inlet conduit in the lower regions of each of the trays. The inlet conduit 70 extends upwardly and laterally from the casing to a source of dust-laden air.

Water or other similar liquid is introduced into the uppermost tray 53 through a water flow or inlet box 71 similar to the box 26 hereinbefore described. The interior of the box 71 is divided into a pair of chambers B and C by a central baffle 27, and a pair of dams 29 and 30 are positioned within the chambers to receive fluid flow from an inlet pipe 28, all as hereinbefore described in connection with the embodiment of Figure 1. The chamber C is vented to the discharge conduit 51 through a pipe 72, and the chamber B is vented to the inlet conduit 70 by means of a pipe 73 also as hereinbefore described.

The operation of the inlet box 71 is substantially the same as the inlet box 26, described in connection with Figure 1, and it will be appreciated that the differential pressure within the chambers B and C is that pressure difference between the inlet conduit 70 and the outlet conduit 51. This pressure differential is equivalent to a pressure drop across any one of the trays 53 and the uppermost tray 56. The chamber B discharges through a conduit 74 into the trough 64 of the uppermost tray 53, and this water from the trough passes through the first tray 53, the second tray 53, the third tray 53, and thence through the conduit 56 in the lowermost tray into a sump or settling tank 75. The chamber C discharges directly through a line 76 into the sump 75 in the same manner as hereinbefore described in connection with the discharge of the chamber C of the flow box 57 in the embodiment of Figure 1.

The operation of the dust collector illustrated in Figure 2 substantially is as follows: dust-laden air entering through the inlet conduit 70 is divided into a plurality of streams each of which passes upwardly through one of the trays 53 of the water bath maintained therein in accordance with operation of the inlet box 71. In the passage of the separate air stream through the individual trays, these air streams are united for passage through the final baffle presented by the screen 66 and the spheroids 67 supported thereon.

Inasmuch as the differential pressure is equivalent to the water head in any one of the trays 53, by virtue of the height differential between the dams 29 and 30, it will be seen that the inlet box is effective to maintain a given water level to the uppermost trays and consequently in each of the lower trays. An added feature of this form of the invention is that any one or more of the trays may be isolated and rendered inoperative by merely closing the inlet for that respective tray, with the pressure head being automatically adjustable to maintain a given pressure differential across the remaining tray or trays.

From the description hereinbefore given, it will be appreciated that the present invention provides a novel means and method for maintaining a desired water level within a dust collector and that this water level is dependent upon the pressure drop across a water bath through which dust-laden air or similar fluid is bubbled. It will, of course, be appreciated that liquids other than water may be utilized in connection with the present invention so long as the differential height of the dam and the pressure drop across any given tray is adjusted for the density of the liquid being utilized. Similarly, the apparatus and its function are appreciable to the removal of any type of solid foreign particles dispersed in any suitable fluid. Accordingly, in the claims, the terms "water" and "air" are used generically to denote any suitable liquid and gas respectively.

It will be understood that modifications and variations may be effected without departing from the scope of the novel concepts of the present invention.

I claim as my invention:

1. In a dust collector having a casing provided with an inlet for dust-laden air, an outlet for clean air and an air passageway therebetween, the improvements which comprise a liquid bath disposed in said passageway for dust-laden air flow therethrough, and means for maintaining a variable liquid level in said bath in accordance with the drop in pressure within said air flowing therethrough, said means including a body of liquid disposed adjacent said collector for delivering liquid to said casing at the liquid bath, means for continuously delivering liquid to said body of liquid, means subjecting said body of liquid to the differential air pressure across said bath, means responsive to the differential air pressure for delivering liquid to said casing when the differential pressure decreases below a predetermined value, and means for discharging liquid delivered to said body of liquid when the differential pressure is above the predetermined value.

2. In a dust collector having means for inducing a flow of fluid therethrough, a water level control for a water bath interposed in the path of fluid flow comprising a pair of adjacent intercommunicating water chambers for containing water columns of different heights, means venting the higher of said columns to fluid pressure beyond said bath, means for venting the other of said columns to fluid pressure ahead of said bath, means for continuously delivering a liquid to said water chambers, means for flowing water to said bath when the lower column begins to rise above a predetermined height and means for discharging water delivered to said chambers when the higher column begins to rise above a predetermined height.

3. In a dust collector having means for inducing a flow of fluid therethrough, a water level control for a water bath interposed in the path of fluid flow comprising a pair of adjacent intercommunicating water chambers for containing water columns of different heights, means venting the higher of said columns to fluid pressure beyond said bath, means for venting the other of said columns to fluid pressure ahead of said bath, a conduit for continuously delivering water to said water chambers, means for delivering water to said bath from the lower of said columns when the level of liquid of the lower column tends to rise above a predetermined value due to delivery of water from said conduit to said water chambers, and means for discharging water from the higher of said columns to a sump when the level of liquid in the higher column tends to rise above a predetermined height due to delivery of water from said conduit to said water chambers.

4. In a dust collector having means for inducing a flow of fluid therethrough, a water level control for a water bath interposed in the path of fluid flow comprising a pair of adjacent intercommunicating water chambers for containing water columns of different heights, means venting the higher of said columns to fluid pressure beyond said bath, means for venting the other of said columns to fluid pressure ahead of said bath, a conduit for continuously delivering water to said chambers, a pair of overflow chambers one adjacent each of said water columns, means for delivering water from each of said columns to the adjacent overflow chamber when the column associated tends to rise above a predetermined height due to water supplied by said conduit, and means for delivering water from the overflow chamber adjacent the lower column to said bath.

5. In a dust collector having means for inducing a flow of fluid therethrough, a water level control for a water bath interposed in the path of fluid flow comprising a hollow casing, a first partition depending from the roof of said casing to divide the casing into first and second intercommunicating chambers, a pair of walls extending upwardly from the bottom of said casing in spaced relation to said depending partition to define a pair of intercommunicating columns of differing heights, means venting the higher of said columns to fluid pressure beyond said bath, means for venting the other of said columns to fluid pressure ahead of said bath, means for delivering liquid continuously to said columns, and means for delivering fluid overflowing the lower wall to said bath, and means for delivering liquid overflowing the higher wall to a sump.

6. The method of supplying water to a water bath having a fluid stream flowing therethrough to maintain a constant pressure differential between the upstream and downstream sides of said bath which comprises forming a pair of intercommunicating water columns of different heights, venting one of said columns to the fluid stream upstream of said bath, venting the other of said columns to the fluid stream downstream of said bath, continuously supplying water to the columns, delivering water to the bath from the column vented upstream of the bath when the column tends to rise above a predetermined level and discharging liquid from the other column when the level of the other column tends to rise above a second predetermined level.

7. In a method of collecting dust from a fluid stream by passing the fluid stream through a liquid bath, the steps of dividing a body of liquid into a pair of columns of different heights in flow communication with one another, venting the fluid stream upstream of said bath to one of said columns, venting the fluid stream downstream of said bath to the other of said columns, continuously delivering liquid to said body of liquid, withdrawing liquid from the lower of said columns when the height of the lower column begins to exceed a predetermined value due to delivery of liquid to the body of liquid, and withdrawing liquid from the higher of the columns when the height thereof begins to exceed a predetermined value due to delivery of liquid to the body of liquid, and conducting liquid withdrawn from the lower of said columns to said bath, and collecting the water withdrawn from the higher of said columns in a sump.

ROBERT L. McILVAINE.

References Cited in the file of this patent

UNITED STATES PATENTS

| Number | Name | Date |
|---|---|---|
| 2,394,023 | Strickland | Feb. 5, 1946 |

FOREIGN PATENTS

| Number | Country | Date |
|---|---|---|
| 102,216 | Sweden | Aug. 5, 1941 |
| 292,102 | Italy | Jan. 5, 1932 |